(12) United States Patent
Rudraraju et al.

(10) Patent No.: US 12,244,620 B2
(45) Date of Patent: Mar. 4, 2025

(54) SYSTEM AND METHOD FOR ANOMALY DETECTION FOR INFORMATION SECURITY

(71) Applicant: Bank of America Corporation, Charlotte, NC (US)

(72) Inventors: Rama Krishnam Raju Rudraraju, Telangana (IN); Om Purushotham Akarapu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 231 days.

(21) Appl. No.: 17/815,963

(22) Filed: Jul. 29, 2022

(65) Prior Publication Data
US 2024/0039935 A1 Feb. 1, 2024

(51) Int. Cl.
*H04L 9/40* (2022.01)
(52) U.S. Cl.
CPC .................. *H04L 63/1425* (2013.01)
(58) Field of Classification Search
CPC .................................. H04L 63/1425
See application file for complete search history.

(56) References Cited

U.S. PATENT DOCUMENTS

| | | | |
|---|---|---|---|
| 8,237,771 B2 | 8/2012 | Kurtz et al. | |
| 8,245,283 B2 | 8/2012 | Dawson et al. | |
| 8,253,770 B2 | 8/2012 | Kurtz et al. | |
| 8,274,544 B2 | 9/2012 | Kurtz et al. | |
| 8,751,626 B2 | 6/2014 | Pinkston et al. | |
| 9,875,580 B2 | 1/2018 | Cannon et al. | |
| 9,895,612 B2 | 2/2018 | Pacey et al. | |
| 10,373,129 B1 | 8/2019 | James et al. | |
| 10,416,837 B2 * | 9/2019 | Reif | G02B 27/017 |
| 10,438,290 B1 | 10/2019 | Winklevoss et al. | |
| 10,540,640 B1 | 1/2020 | James et al. | |
| 10,540,653 B1 | 1/2020 | James et al. | |
| 10,540,654 B1 | 1/2020 | James et al. | |
| 10,609,438 B2 * | 3/2020 | Branch | H04N 21/41407 |
| 10,685,495 B1 * | 6/2020 | Booysen | G06T 15/00 |

(Continued)

OTHER PUBLICATIONS

"JP Morgan is first leading bank to launch in the metaverse," Feb. 17, 2022, https://fintechmagazine.com/banking/jp-morgan-becomes-the-first-bank-to-launch-in-the-metaverse.

(Continued)

*Primary Examiner* — Javier O Guzman

(57) ABSTRACT

A system for implementing anomaly detection accesses user activities associated with an avatar in a virtual environment. The system extracts features from the user activities, where the features provide information about interactions of the avatar with other avatars and entities in the virtual environment. The system determines a deviation range for each feature, where the deviation range indicates a deviation between the features among the avatars over a certain period. The system determines whether the deviation range for a feature is more than a threshold deviation. If it is determined that a deviation range of a feature is more than the threshold deviation, a confidence score associated with the user is updated based on the deviation range of the feature. If the confidence score is more than a threshold score, the user is not associated with an anomaly. Otherwise, the user is determined to be associated with an anomaly.

20 Claims, 4 Drawing Sheets

(56) References Cited

U.S. PATENT DOCUMENTS

| | | | |
|---|---|---|---|
| 10,915,891 B1 | 2/2021 | Winklevoss et al. | |
| 10,929,842 B1 | 2/2021 | Arvanaghi et al. | |
| 10,962,780 B2* | 3/2021 | Ambrus | G06T 15/005 |
| 11,017,391 B1 | 5/2021 | Winklevoss et al. | |
| 11,139,955 B1 | 10/2021 | So et al. | |
| 11,200,569 B1 | 12/2021 | James et al. | |
| 11,235,530 B2 | 2/2022 | Kaltenbach et al. | |
| 11,282,139 B1 | 3/2022 | Winklevoss et al. | |
| 11,334,883 B1 | 5/2022 | Auerbach et al. | |
| 11,477,509 B2* | 10/2022 | Branch | H04N 21/8146 |
| 2008/0303811 A1 | 12/2008 | Van Luchene | |
| 2008/0317292 A1* | 12/2008 | Baker | G06V 40/12 |
| | | | 382/115 |
| 2009/0165021 A1 | 6/2009 | Pinkston et al. | |
| 2009/0170604 A1 | 7/2009 | Mueller et al. | |
| 2014/0281850 A1 | 9/2014 | Prakash et al. | |
| 2014/0333414 A1* | 11/2014 | Kursun | G06V 40/50 |
| | | | 340/5.82 |
| 2018/0004286 A1* | 1/2018 | Chen | G06F 3/0481 |
| 2019/0109878 A1* | 4/2019 | Boyadjiev | G06N 5/022 |
| 2019/0362156 A1* | 11/2019 | Muppala | G06F 9/3877 |
| 2021/0074068 A1* | 3/2021 | Spivack | G06N 20/00 |
| 2021/0192195 A1* | 6/2021 | Kim | G06V 20/20 |
| 2021/0314408 A1* | 10/2021 | Hodge | G06F 21/32 |
| 2022/0198254 A1 | 6/2022 | Dalli et al. | |
| 2022/0207818 A1* | 6/2022 | Allen | G09B 19/003 |
| 2023/0291740 A1* | 9/2023 | Ashby | G06Q 30/015 |
| 2024/0001246 A1* | 1/2024 | Soryal | A63F 13/67 |

OTHER PUBLICATIONS

"Transforming the way money, information and assets move around the world," Printed on Mar. 11, 2024, JPMorgan Chase & Co.; https://www.jpmorgan.com/onyx/index.

Rama Krishnam Raju Rudaraju, U.S. Appl. No. 17/815,965, filed Jul. 29, 2022, "Optimizing anomaly detection on user clustering, outlier detection, and historical data transfer paths."

* cited by examiner

SYSTEM AND METHOD FOR ANOMALY DETECTION FOR INFORMATION SECURITY

TECHNICAL FIELD

The present disclosure relates generally to information security, and more specifically to a system and method for anomaly detection for information security.

BACKGROUND

In a network environment, computing devices are in data communication with other computing devices that may be distributed anywhere in the world. These network environments allow data and information to be shared among these devices. Some of the technical challenges that occur when data is exchanged between devices are controlling data leakage, unauthorized access to data, and preventing malicious activities. Data storing computing devices, such as computers, laptops, augmented reality devices, virtual reality devices, and smartphones, are vulnerable to attacks. This vulnerability poses several network security challenges. Existing systems are typically unable to detect a network attack until after the attack has occurred. For example, a bad actor may connect to a computing device within a network environment which then allows the bad actor to gain unauthorized access to information that is stored in the computing device. The bad actor may also perform other malicious activities such as spoofing or pretending to be another user to gain access to other users' information.

SUMMARY

The system described in the present disclosure provides several practical applications and technical advantages that overcome the current technical problems as described herein. The following disclosure is particularly integrated into a practical application of anomaly detection for users within a virtual environment. This, in turn, provides an additional practical application of improving the information security technology and therefore improving the information security of computer systems that users use to access the virtual environment. These practical applications and technical advantages stemmed from them are described below.

Anomaly Detection for Information Security within a Virtual Environment

The disclosed system contemplates a system and a method for anomaly detection for users within virtual environments. In an example operation, users may use avatars to access the virtual environments. Different virtual environments may be associated with different entities or organizations. The disclosed system is configured to monitor user activities (or avatar activities) in multiple virtual environments. The user activities may include interactions of the user (or avatar) with other users (or other avatars) and/or entities (e.g., organizations that provide services and products to the users) in a virtual environment.

The disclosed system is configured to use the user activities to determine a set of features associated with the user. The set of features may provide information about the interactions of the user (or avatar) with other users (or other avatars) and/or entities in the multiple virtual environments. For example, the set of features may include records of login frequency to the virtual environments, the number of interactions of the user (or avatar), the type of interactions of the user (or avatar), the period of time that the user has accessed the virtual environments, and the Internet Protocol (IP) address of a computing device that the user uses to access the virtual environments, among others.

The disclosed system is configured to use the set of features to determine a confidence score for the user, where the confidence score indicates whether the user is associated with an anomaly or not. For example, if the confidence score for the user is determined to be less than a threshold score, it is determined that the user is not associated with an anomaly. Otherwise, it is determined that the user is associated with the anomaly. Examples of the anomaly may include that the user has been involved in fraudulent activity, the user has performed an unexpected interaction or activity in the virtual environment, among others. For example, an unexpected interaction or activity may include that the user has not logged into the virtual environment for more than a certain period (e.g., more than five years, etc.) and suddenly the login frequency shows that the user logs into the virtual environment more than a threshold frequency (e.g., more than five times a day, etc.).

In another example, an unexpected interaction or activity may include that the user has not performed any interaction or less than a threshold number of interactions with other users (or their avatars) or other entities in the virtual environment, and suddenly the interactions of the user over the certain period show that the user has performed more than a threshold number of interactions with other users (or their avatars) or other entities in the virtual environment. For example, fraudulent activity may include that the user has been identified as a bad actor, for example, by attempting to gain unauthorized access to other avatars, performing an interaction with another avatar or entity that is against the virtual environment guidelines, among others.

The disclosed system is configured to detect such anomalies and determine a confidence score for the user. The disclosed system is configured to determine whether to authorize or deny the user to perform any interaction in the virtual environment based on the confidence score. For example, assume that the user requests to perform an interaction with an entity (or an avatar associated with another user) in the virtual environment. If the confidence score of the user is more than the threshold score, the disclosed system may grant the user's request and authorize the user to perform the interaction. Otherwise, the disclosed system may deny the user's request and prevent the user to perform the interaction. In some cases, a bad actor may hack into the user's virtual profile, access the user's avatar, and perform unexpected actions, interactions, or fraudulent activities in the virtual environment. The disclosed system detects such activities and prevents the bad actor from performing any action until the user's virtual profile and avatar are recovered.

Accordingly, by detecting anomalies in the virtual environments, the underlying operations of the virtual environment are improved. Therefore, the disclosed system is integrated into a practical application of anomaly detection for users within a virtual environment, which, in turn, improves the interactions among users and entities in the virtual environment, and underlying operations of the virtual environment.

In one embodiment, a system for implementing anomaly detection comprises a memory and a processor. The memory is configured to store first user activities associated with an avatar within a first virtual environment, wherein the avatar is associated with the user, and the first user activities comprise one or more first interactions between the avatar and other entities in the first virtual environment. The processor is operably coupled with the memory. The processor accesses the first user activities. The processor extracts a first set of features from the first user activities, wherein the first set of features provides information about at least the one or more first interactions. For a first feature from among the first set of features, the processor determines a first deviation range that indicates a deviation between the first feature associated with the user and the first feature associated with one or more other users over a certain period. The processor determines whether the first deviation range is more than a threshold deviation. The processor determines a confidence score associated with the user based at least in part upon the first deviation range, wherein the confidence score indicates whether the user is associated with an anomaly, such that if the confidence score is more than a threshold percentage, the user is not associated the with an anomaly, and if the confidence score is less than the threshold percentage, the user is associated with the anomaly.

Optimizing Anomaly Detection Based on User Clustering, Outlier Detection, and Historical Data Transfer Paths The disclosed system contemplates a system and a method for optimizing the anomaly detection process based on user clustering, outlier detection, and historical data transfer paths.

In an example operation, the disclosed system may determine the confidence score for a user based on user activities within a virtual environment, similar to that described above.

The disclosed system may determine a cluster that the user belongs to based on their determined confidence score. For example, if it is determined that the determined confidence score of the user is less than a threshold value, the disclosed system may determine that the user belongs to a first cluster. Similarly, if it is determined that the determined confidence score of the user is more than the threshold value, the disclosed system may determine that the user belongs to a second cluster. The user clustering may indicate to which cluster the user belongs.

In some cases, a user may be an outlier compared to other users. For example, if the user has not logged into a virtual environment and suddenly the login frequency of the user shows that the user logs into the virtual environment more than a threshold frequency (e.g., more than five times a day, etc.), the disclosed system may determine that the user is an outlier. The outlier detection information may indicate whether the user is an outlier or not.

The disclosed system is also configured to track resource/data transfer routings among users (e.g., among avatars within virtual environments) and among users and entities. As users operate within a virtual environment, they may communicate resources/data with one another, and with other entities. Resources may include virtual files, virtual documents, virtual objects, virtual products, virtual services, among others. By tracking the resource transfer routings within a virtual environment, the disclosed system may detect suspicious transfers and interactions. Suspicious transfers and interactions may be associated with avatars that are already identified to be bad actors based on detecting attempts of those avatars to gain unauthorized access to other avatars, resources, performed an interaction with another avatar or entity that is against the virtual environment guidelines, among others. The disclosed system may use the user clustering information, outlier detection information, and resource/data transfer path information to update a confidence score associated with a user. For example, if the resource transfer path information indicates that the user has transferred a virtual resource associated with the anomaly to another avatar within the virtual environment, the disclosed system may decrease the confidence score associated with the user. In this manner, the disclosed system improves the accuracy of the confidence score.

The disclosed system may allow or deny user's request to perform actions in the virtual environment based on their confidence score. If the confidence score is below a threshold value, the disclosed system may deny the user's request to perform actions or interactions with other avatars. Therefore, if the user is determined to be a bad actor (i.e., as a result of having a confidence score less than a threshold value), the user is prevented from performing any kind of actions or interactions with other avatars. Thus, virtual resources associated with the virtual environment and the other avatars are kept secure from malicious attempts to gain unauthorized access. In this manner, the underlying operation of the virtual environment is improved and resources of the virtual environment are protected from unauthorized access. This, in turn, provides an additional practical application of improving the underlying operations of computer systems that are used to host and maintain the virtual environment.

Furthermore, by preventing bad actors to interact with other avatars, profiles of the other avatars are kept secure from the bad actors. Accordingly, the disclosed system is integrated into an additional practical application of improving the security of the avatar profiles and their resources. This, in turn, provides an additional practical application of improving the underlying operations of computer systems that users use to access the virtual environment.

In one embodiment, a system for optimizing anomaly detection comprises a memory and a processor. The memory is configured to store user activities associated with a user within a virtual environment, wherein the user activities comprise one or more interactions between an avatar associated with the user and at least one other avatar within the virtual environment. The memory is further configured to store a confidence score associated with the user, wherein the confidence score indicates whether the user is associated with an anomaly, such that if the confidence score is more than a threshold score, the user is not associated the with an anomaly, and if the confidence score is less than the threshold score, the user is associated with the anomaly. The processor is operably coupled to the memory. The processor determines, based at least in part upon the confidence score, user clustering information that indicates a cluster to which the user belongs. In response to determining that the confidence score is more than the threshold score, the user clustering information indicates that the user belongs to a first cluster. In response to determining that the confidence score is less than the threshold score, the user clustering information indicates that the user belongs to a second cluster. The processor determines, based at least in part upon the user activities, user outlier information that indicates whether the user is associated with unexpected user activity, wherein the unexpected user activity comprises performing more than a threshold number of interactions with at least one other avatar after not accessing the virtual environment for more than a threshold period. The processor determines virtual resource routing information that comprises routings of virtual resources between the avatar and the other avatars within the virtual environment, wherein the virtual resources comprise an virtual object. The processor updates the confidence score based at least in part upon at least one of the user clustering information, the user outlier information, or the virtual resource routing information.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions for anomaly detection within a virtual environment. Embodiments of the present disclosure and its advantages may be understood by referring to FIGS. 1 through 4. FIGS. 1 through 4 are used to describe a system and method for anomaly detection within a virtual environment.

System Overview

Figure 1:
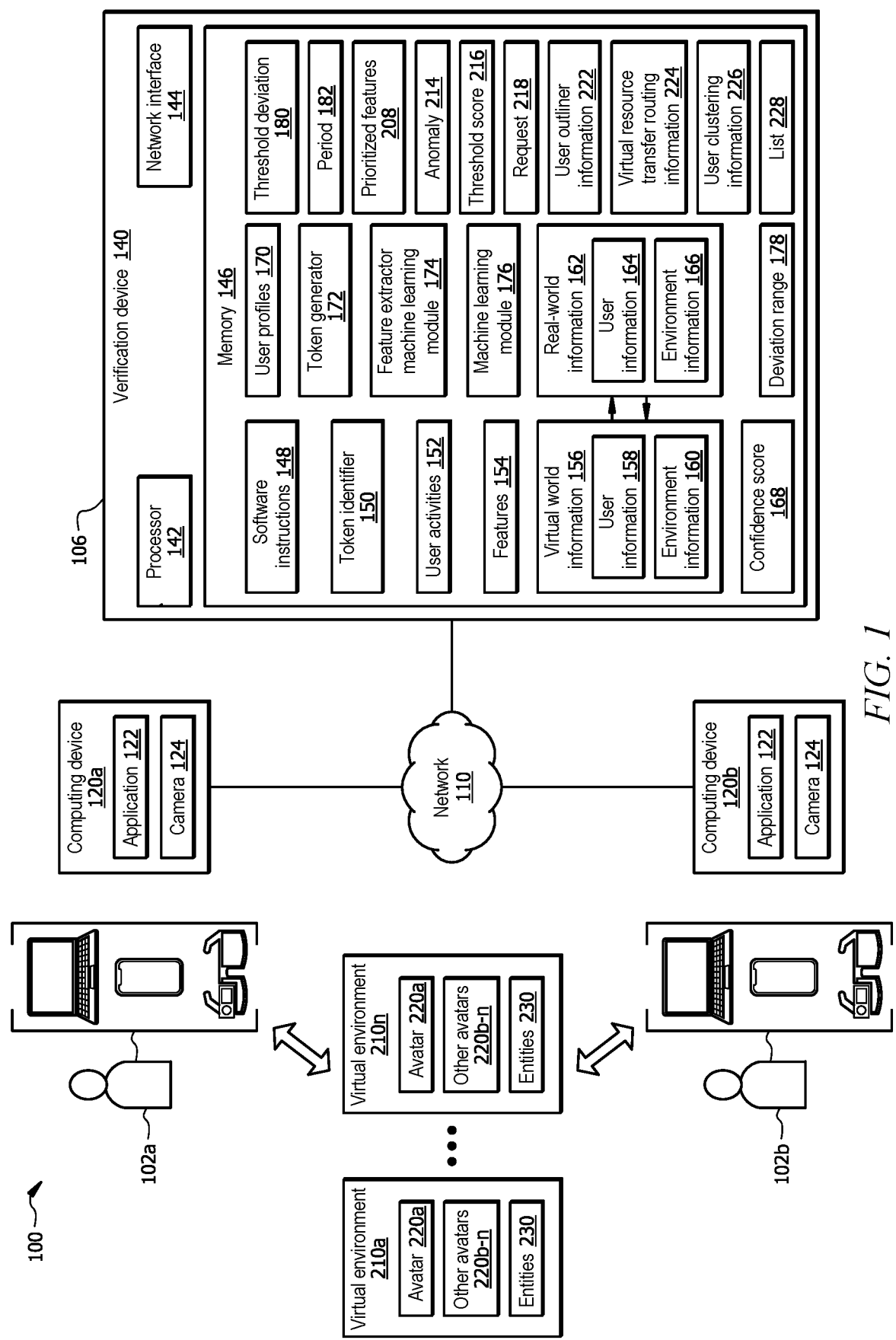
FIG. 1 illustrates an embodiment of a system configured to provide anomaly detection within a virtual environment.

FIG. 1 illustrates an embodiment of a system 100 that is generally configured to implement anomaly detection and provide information security and user authentication for users 102 in a virtual environment 210. For example, the system 100 may be configured to determine whether a user 102 is associated with an anomaly 214. This technology may be employed to authenticate a user before allowing the user to perform any kind of action or interaction within the virtual environment 210. Therefore, the system 100 is configured to improve the user authentication in the virtual environment 210. If it is determined that the user is associated with an anomaly 214, the user may be prevented to perform interactions within the virtual environment. This technology provides improved operations within the virtual environment because interactions requested by users associated with anomalies 214 are denied. Therefore, the underlying operations of the virtual environment 210 are improved.

In another example, the system 100 may be configured to utilize user activities 152 in multiple virtual environments 210a to 210n to determine the user's behavior in the multiple virtual environments 210a to 210n. Different virtual environments 210 may be associated with different entities or organizations. The system 100 may use the user activities 152 to determine features 154 that represent the user activities 152 in the virtual environments 210a-n. The system 100 may determine which feature(s) 154 should be prioritized in determining a confidence score 168 for a user 102 that represents whether a user 102 is associated with an anomaly 214 or not.

In certain embodiments, the system 100 comprises a verification device 140 operably coupled to one or more computing devices 120 (e.g., computing devices 120a,b) via a network 110. Network 110 enables the communication between the components of the system 100. Verification device 140 comprises a processor 142 in signal communication with a memory 146. Memory 146 stores software instructions 148 that when executed by the processor 142, cause the verification device 140 to perform one or more operations described herein. For example, when the software instructions 148 are executed, the verification device 140 determines the identity of a user 102 based on multifactor authentication factors (e.g., real-world information and virtual world information) associated with the user 102, generate a unique and non-transferable token identifier 150 for the user 102, determine user activities 152 in one or more virtual environments 210, determine a set of features 154 based on the user activities 152, determine prioritized features 208, and determine a confidence score 168 based on one or more of features 154 (e.g., the prioritized features 208). Based on the confidence score 168, the system 100 may determine whether to allow or prevent the user 102 to perform any interaction with other users 102 and entities 230 in the virtual environment 210. In other embodiments, system 100 may not have all of the components listed and/or may have other elements instead of, or in addition to, those listed above.

The system 100 may further be configured to generate a non-mutable token 150 based on the user information 164 and user information 158. The non-mutable token 150 may be a software token that is a security artifact that uniquely identifies the user 102. The system 100 may use the token 150 to verify the identity of the user 102.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

Each of the computing devices 120a and 120b is an instance of a computing device 120. A computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices via the network 110, such as the verification device 140.

Each computing device 120 includes and/or operably coupled with a camera 124. The Camera 124 may be or include any camera that is configured to capture images of a field of view in front of the computing device 120. Examples of the camera 124 may include charge-coupled device (CCD) cameras and complementary metal-oxide semiconductor (CMOS) cameras. The camera 124 is configured to capture images of a user 102 within a real environment. The camera 124 is a hardware device that is configured to capture images continuously, at predetermined intervals, or on-demand. For example, the camera 124 is configured to receive a command from a user 102 to capture an image. In another example, the camera 124 is configured to continuously capture images to form a video stream of images. The camera 124 may transmit the captured images and/or video stream to the verification device 140. The verification device 140 may use the images to identify the user 102 based on a comparison between a received image and an image in user profiles 170.

Each computing device 120 is configured to display a two-dimensional (2D) or three-dimensional (3D) representation of a virtual environment 210 to a user. Examples of a virtual environment 210 include, but are not limited to, a graphical or virtual representation of a metaverse, a map, a city, a building interior, a landscape, a fictional location, an alternate reality, or any other suitable type of location or environment.

Virtual Environment

Each of the virtual environments 210a to 210n is an instance of a virtual environment 210. A virtual environment 210 may be configured to use realistic or non-realistic physics for the motion of objects within the virtual environment 210. For example, some virtual environments 210 may be configured to use gravity whereas other virtual environments 210 may be configured not to use gravity. Within the virtual environment 210, each user 102 may be associated with an avatar 220. An avatar 220 is a graphical representation of the user 102 within the virtual environment 210. Examples of avatars 220 include, but are not limited to, a person, an animal, or an object. In some embodiments, the features and characteristics of the avatar 220 may be customizable and user-defined. For example, the size, shape, color, attire, accessories, or any other suitable type of appearance features may be specified by a user 102. By using an avatar 220, a user 102 is able to move within the virtual environment 210 to interact with other avatars 220 and objects within the virtual environment 210.

Each computing device 120 is further configured to allow a user 102 to send requests to and generally communicate with the verification device 140. For example, a user 102 may use a computing device 120 to send a request 218 that requests to perform an interaction with an avatar 220 associated with another user 102 or an entity 230 in the virtual environment 210. An example of this process is described in more detail below in FIGS. 2-3.

The user 102 may use the computing device 120 to access the application 122. The application 122 may include interfaces that the user 102 can use to operate the avatar 220 in the virtual environment 210. The application 122 may be a web application, a software application, and/or a mobile application.

Verification Device

Verification device 140 is generally a hardware device that is configured to process data and communicate with other components of the system 100 via the network 110. The verification device 140 is further configured to provide services and software and/or hardware resources to computing devices 120. The verification device 140 is further configured to perform one or more operations described further below and in conjunction with the operational flow 200 described in FIG. 2, the method 300 described in FIG. 3, and method 400 described in FIG. 4.

Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to perform the operations of the verification device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of method 300 as described in FIG. 3 and one or more operations of method 400 as described in FIG. 4.

Network interface 144 is configured to enable wired and/or wireless communications. The network interface 144 may be configured to communicate data between the verification device 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-4 along with any other data, instructions, logic, rules, or code operable to implement the function(s) described herein when executed by processor 142. For example, the memory 146 may store software instructions 148, feature extractor machine learning module 174, user profiles 170, deviation ranges 178, virtual world information 156, real-world information 162, token generator 172, token identifier 150, user activities 152, features 154, threshold deviation 180, machine learning module 176, prioritized features 208, threshold score 216, anomaly 214, period 182, confidence score 168, request 218, and/or any other data or instructions. The software instructions 148 may comprise any suitable set of instructions, logic, rules, or code operable to execute the processor 142 and perform the functions described herein, such as some or all of those described in FIGS. 1-4.

The user profiles 170 include one or more user profiles each associated with a respective user 102. For example, the user profile 170 may include a plurality of user information each associated with a respective user 102. The user profile 170 associated with a user 102 may include an image of the user 102, a user credential (e.g., username and password to log in and access the application 122 and thus the avatar 220 in the virtual environment 210), a profile number, a serial number associated with the user 102.

The virtual environment information 156 comprises user information 158 and environment information 160. The user information 158 generally comprises information that is associated with any accounts or profiles that can be used within a virtual environment 210. For example, user information 158 may comprise user profile information, online account information, avatar information, digital resources information, or any other suitable type of information that is associated with a user 102 and their avatar 220 within a virtual environment 210. The environment information 160 generally comprises information about the appearance of a virtual environment 210. For example, the environment information 160 may comprise information associated with objects, landmarks, buildings, structures, avatars, or any other suitable type of element that is present within a virtual environment 210. In some embodiments, the environment information 160 may be used to create a representation of a virtual environment 210 for users 102. In this case, a virtual environment 210 may be implemented using any suitable type of software framework or engine.

The real-world information 162 comprises user information 164 and environment information 166. The user information 164 generally comprises information that is associated with any accounts or profiles that can be used within the real world. For example, user information 164 may comprise user profile information, account information, real-world resource information, or any other suitable type of information that is associated with a user 102 within a real-world environment.

In the same or another example, the user information 164 may include login frequency and login pattern associated with the user 102 that indicates the frequency and pattern of login activities of the user 102 to login to the application 122 and operate the avatar 220 in the virtual environment 210. In the same or another example, the user information 164 may include a user credential (e.g., username and password to log in and access the application 122 and thus the avatar 220 in the virtual environment 210), a profile number, a serial number associated with the user 102. In the same or another example, the user information 164 may include name, address, phone number, and any other information associated with the user 102.

The environment information 166 generally comprises information that is associated with an entity (e.g., organization) within the real world that the user 102 is a member of or is associated with. For example, the environment information 166 may comprise addresses, phone numbers, email addresses, contact names, or any other suitable type of information that is associated with an entity. Since the verification device 140 has access to both the virtual environment information 156 and the real-world information 162, the verification device 140 is able to link together the virtual environment information 156 and the real-world information 162 for a user 102 such that changes to the virtual environment information 156 affect or propagate to the real-world information 162 and vice-versa. For example, the verification device 140 may be configured to store one or more maps (e.g., actions of an avatar 220, interactions among avatars 220, gestures performed by an avatar 220, etc.) that translate or convert different types of interactions between the real world and the virtual environment 210 and vice-versa.

Token Generator

Token generator 172 may be implemented by the processor 142 executing the software instructions 148, and is generally configured to generate tokens 150 (also referred to herein as token identifiers 150) and confidence scores 168 (also referred to herein as upgradable tokens). The token generator 172 is configured to generate a token 150 based on one or more user information 158, 164. In certain embodiments, the token generator 172 may include a hashing algorithm that is configured to implement a hashing operation on one or more user information 158, 164. In certain embodiments, the token generator 172 may include a hashing and/or an encryption algorithm that is configured to implement hashing and/or an encryption operation on one or more user information 158, 164. The generated token 150 associated with a user 102 may be non-fungible—meaning that the generated token 150 cannot be divided into parts.

The token 150 associated with the user 102 is non-transferable—meaning that it cannot be transferred from the user 102 to other users 102. The token 150 may represent a digital identity of the user 102. For example, the token 150 may include data that represents a digital certificate that indicates the digital identity (and/or digital signature) of the user 102. The generated token 150 may include a security artifact (e.g., a number, a serial number, an alphanumerical string, a piece of code, an encrypted code, an obfuscated code, a hashed code, and/or the like) that uniquely identifies the user 102.

The token generator 172 may further be configured to generate confidence scores 168 for users 102. The token generator 172 may be configured to generate a confidence score 168 for a user 102 based on features 154 (or the prioritized features 208) extracted from the user activities 152 of the user 102 in one or more virtual environments 210*a-n*.

In certain embodiments, the token generator 172 may include and/or implement statistical algorithms on the features 154 to determine the confidence score 168. For example, the statistical algorithms may include statistical hypothesis tests, estimation statistics, descriptive statistical analysis, inferential statistical analysis, associational statistical analysis, predictive analysis, prescriptive analysis, exploratory data analysis, causal analysis, and the like. The operations of the token generator 172 with respect to generating a token identifier 150 and a confidence score 168 are described in greater detail in FIGS. 2-4.

Feature Extractor Machine Learning Module

Feature extractor machine learning module 174 may be implemented by the processor 142 executing the software instructions 148, and is generally configured to extract features 154 from the user activities 152. In certain embodiments, the feature extractor machine learning module 174 may be implemented by a plurality of neural network layers, convolutional neural network layers, Long-Short-Term-Memory (LSTM) layers, Bi-directional LSTM layers, recurrent neural network layers, and the like. In certain embodiments, the feature extractor machine learning module 174 may be implemented by any feature extraction method, or any suitable technique. In certain embodiments, the feature extractor machine learning module 174 may include a support vector machine, neural network, random forest, k-means clustering, Tree-based algorithm, Random Forest algorithm, etc.

The feature extractor machine learning module 174 may be given the user activities 152 and asked to output the features 154. In certain embodiments, the feature extractor machine learning module 174 may be implemented by a training dataset that includes user activities 152 each labeled with a respective feature 154. In the training stage, the feature extractor machine learning module 174 may be trained by the training dataset. The feature extractor machine learning module 174 learns the associations and relationships between the user activities 152 and the their labels (features 154). The output of the feature extractor machine learning module 174 may be evaluated against the training dataset. In a back propagation operation, bias and weight values of neural network of the feature extractor machine learning module 174 are refined to increase the accuracy of the prediction of the feature extractor machine learning module 174 determining and extracting the features 154 from the user activities 152. In the testing stage, the feature extractor machine learning module 174 may be given unlabeled user activities 152 (e.g., from the training dataset) and asked to predict the features 154. The output of the feature extractor machine learning module 174 may be evaluated against the training dataset. Similar to the training stage, in a back propagation operation, bias and weight values of a neural network of the feature extractor machine learning module 174 are refined to increase the accuracy of the prediction of the feature extractor machine learning module 174 determining and extracting the features 154 from the user activities 152. In supervised learning, an operator may confirm, edit, override, and/or update the output of the feature extractor machine learning module 174. The operator's input may be used as feedback to the feature extractor machine learning module 174 to increase the accuracy of the feature extractor machine learning module 174.

Machine Learning Module

Machine learning module 176 may be implemented by the processor 142 executing the software instructions 148, and is generally configured to determine and select prioritized features 208 from among the features 154. In certain embodiments, the machine learning module 176 may be implemented by a plurality of neural network layers, convolutional neural network layers, Long-Short-Term-Memory (LSTM) layers, Bi-directional LSTM layers, recurrent neural network layers, and the like. In certain embodiments, the machine learning module 176 may include a support vector machine, neural network, random forest, k-means clustering, Tree-based algorithm, Random Forest algorithm, etc.

The machine learning module 176 may be implemented by supervised, semi-supervised, or unsupervised machine learning techniques. For example, the machine learning module 176 may be given a set of features 154 that are labeled with prioritized features 208 (e.g., a training dataset comprising the set of features 154 labeled with prioritized features 208). In the training stage, the machine learning module 176 may learn the associations and relationships between the features 154 and prioritized features 208. For example, the machine learning module 176 may learn that the prioritized features 208 are determined based on deviation ranges 178 of the features 154 among the users 102. For example, the machine learning module 176 may learn that if a deviation range 178 for a feature 154 among the users 102 over a certain period 182 is determined to be more than a threshold deviation 180, the feature 154 is a prioritized feature 208. In the same or another example, the machine learning module 176 may learn that if a deviation range 178 for a feature 154, e.g., the difference between the maximum value and the minimum value of the feature 154 for each user 102 over a certain period 182 is determined to be more than a threshold deviation 180, the feature 154 is a prioritized feature 208.

The output of the machine learning module 176 may be evaluated against the training dataset. In a back propagation operation, bias and weight values of neural network of the machine learning module 176 are refined to increase the accuracy of the prediction of machine learning module 176 determining the prioritized features 208.

In the testing stage, the machine learning module 176 may be given unlabeled features 154 and asked to predict the prioritized features 208. The output of machine learning module 176 may be evaluated against the training dataset. Similar to the training stage, in a back propagation operation, bias and weight values of a neural network of the machine learning module 176 are refined to increase the accuracy of the prediction of the machine learning module 176 determining the prioritized features 208. In supervised learning, an operator may confirm, edit, override, and/or update the output of the machine learning module 176. The operator's input may be used as feedback to the machine learning module 176 to increase the accuracy of the machine learning module 176.

Example Operational Flow for Anomaly Detection within a Virtual Environment

Figure 2:
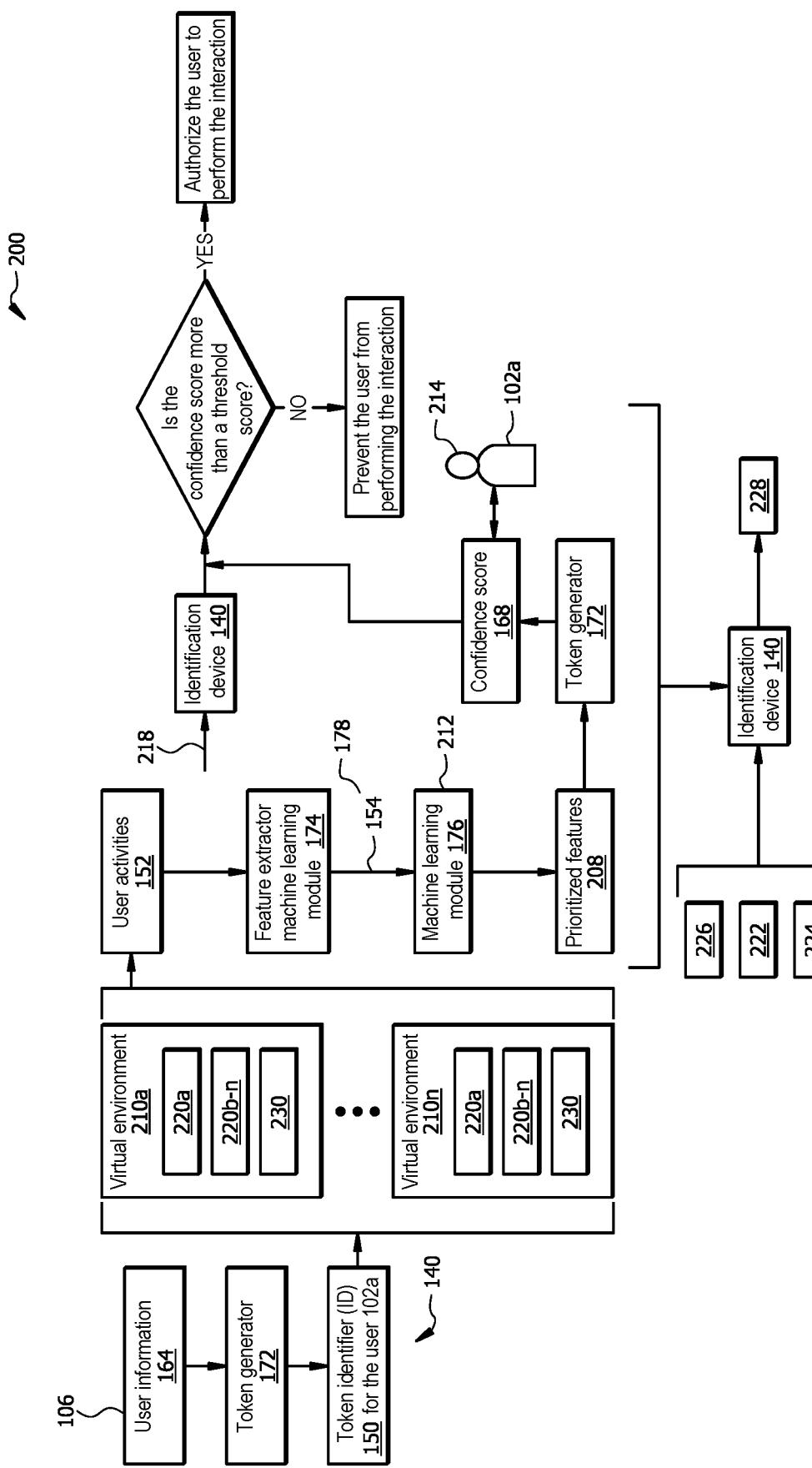
FIG. 2 illustrates an example operational flow of system of FIG. 1 for anomaly detection within a virtual environment.

FIG. 2 illustrates an example operational flow 200 of system 100 of FIG. 1 for anomaly detection within a virtual environment 210. The operational flow 200 may begin when the verification device 140 accesses user information 164 associated with a user 102 (e.g., user 102a). The verification device 140 may monitor user activities, such as login behaviors to the application 122 to access the virtual environment 210, and access user information such as the name, address, phone number, and other information associated with the user 102 from a database (not explicitly shown) that stores the user information. The verification device 140 may access the user information 164 from the organization 106 (e.g., a database that stores user profiles (not explicitly shown)).

The verification device 140 feeds the user information 164 to the token generator 172 to generate a unique token identifier 150 for the user 102. The token generator 172 may parse the user information 164 and implement any suitable algorithm (e.g., hashing, encryption, and the like) to generate a unique token identifier 150 for the user 102 based on the user information 164. In a similar manner, the verification device 140 (via the token generator 172) may generate other unique token identifiers 150 for other users 102.

Determining User Activities in Virtual Environments

The user 102a may log into one or more virtual environments 210a-n and perform one or more interactions with other users 102a (e.g., with other avatars 220a-n and/or entities 230). The verification device 140 may monitor the user 102a operating the avatar 220a in the virtual environments 210a-n and determine the user activities 152 in the virtual environments 210a-n. The user activities 152 may include interactions between the user 102a and other users 102a in the virtual environments 210a-n (e.g., interactions between the avatar 220a and other avatars 220b-n), interactions between the user 102a and entities 230.

The entities 230 may include organizations that have a virtual branch in the virtual environments 210a-n, groups, communities, and the like in the virtual environments 210a-n. The entities 230 may provide virtual products and/or virtual services to the users 102 in the real world and/or in the virtual environments 210a-n (e.g., to the avatars 220a-n in the virtual environments 210a-n). The entities 230 may also provide physical products and/or services to the users 102 in the real world. The interactions may include transferring virtual objects, and virtual resources (e.g., virtual products and/or virtual services). The user activities 152 may further include any action that the user 102a operating the avatar 220a performs in the virtual environment 210, such as jumping, roaming around, traveling, visiting virtual locations, and the like.

Extracting Features from the User Activities

The verification device 140 feeds the user activities 152 to the feature extractor machine learning module 174 to extract features 154 from the user activities 152. The feature extractor machine learning module 174 may extract the features 154 from the user activities 152 by implementing a neural network that is pre-trained to identify the features 154 when given the user activities 152, e.g., by supervised learning, semi-supervised learning, and/or unsupervised learning techniques.

Examples of the features 154 associated with the user 102a may include a time period during which the user 102a has accessed a given virtual environment 210, a frequency of historical interactions between the user 102a (or the avatar 220a) with the other entities 230 (and other avatars 220b-n), a number of historical interactions between the user 102a (or the avatar 220a) with the other entities 230, an Internet Protocol (IP) address associated with the computing device 120a from which the user 102a accesses the virtual environments 210a-n, an engagement level of the user 102a to a given virtual environment 210, where the engagement level include the user login frequency to access the given virtual environment 210, community membership of the user 102a in the virtual environments 210a-n, where the community membership indicates to what communities, groups, organizations, collectively referred to herein as entities 230 that the user 102a is associated with or is a member of, virtual resources associated with the user 102a, where the virtual resources include resources that the user 102a may use to perform any interaction with other users 102 (e.g., with other avatars 220b-n) and/or entities 230, among others.

The verification device 140 determines which one or more of the features 154 are important (i.e., prioritized features 208). In other words, the verification device 140 may determine which feature(s) 154 is a differentiator among users 102 (e.g., between the user 102a and other users 102) and therefore should be prioritized in determining a confidence score 168 for the user 102a. The prioritized features 208 are features 154 that may be differential or vary for more than a threshold deviation 180 between the users 102.

For example, the verification device 140 may feed the features 154 to a machine learning module 176 that is configured to determine and select the important features 154—i.e., prioritized feature 208, similar to that described in FIG. 1. To this end, the verification device 140 may determine a deviation range 178 for each feature 154, where the deviation range 178 for a feature 154 may indicate a deviation or difference between the feature 154 for all users 102, e.g., the value of the feature 154 for the user 102a and the value of the feature 154 for other users 102 over a certain period 182 (e.g., over a week, a day, a month, five hours, or any suitable period).

For example, the verification device 140 (via the machine learning module 176) may determine that a first feature 154 is differential or varies between the users 102 (i.e., it is a prioritized feature 208) if a deviation range 178 between the first feature 154 associated with the first user 102a (and their respective avatar 220a) and the first feature 154 associated with other users 102 (and their respective avatars 220b-n) is more than a threshold deviation 180 or threshold deviation percentage 180 (e.g., 70%, 75%, etc. of the total range of the feature 154).

In certain embodiments, the deviation range 178 of a feature 154 may indicate a deviation or difference between the maximum value of the feature 154 and the minimum value of the feature 154 over a certain period 182. For example, the verification device 140 (via the machine learning module 176) may determine that a second feature 154 can be used to identify the user 102a and therefore differentiate the user 102a from other users 102 (i.e., it is a prioritized feature 208) if a second deviation range 178 associated with the second feature 154 is more than the threshold deviation percentage 180, where the second deviation range 178 may indicate a deviation or difference between the maximum value of the second feature 154 and the minimum value of the second feature 154 over the certain period 182.

For example, in a case where the feature 154 is the IP address of the computing device 120a, if multiple users 102 use the computing device 120a to login to the application 122 and access the virtual environment 210 (e.g., on different occasions), the IP address may not be differential or vary among the users 102, i.e., it is not a prioritized feature 208. But, if the IP address for each user 102 is different, then the IP address may be a prioritized feature 208. For example, if it is determined that out of total of a hundred users 102 of the virtual environment 210, each user 102 is using a different IP address, it may be determined that the IP address is a prioritized feature 208 because the deviation range 178 for the IP address indicates it provides differentiating factor between the users 102. In this example, the verification device 140 may assign a high weight value 212 to the IP address feature 154.

In another example, if it is determined that out of total of a hundred users 102 of the virtual environment 210, one IP address is used by the users 102 (e.g., users 102 use public computing devices 120 and share IP addresses), it may be determined that the IP address is not a prioritized feature 208 because the deviation range 178 for the IP address does not provide differentiating factor between the users 102. In this example, the verification device 140 may assign a low weight value 212 to the IP address feature 154.

In certain embodiments, the verification device 140 may determine a deviation range 178 for a feature 154 based on the level of its variety among users 102. For example, in case of the IP address as a feature 154, if a hundred users 102 use fifty computing devices 120 (and hence fifty IP addresses) to login to the application 122 and access the virtual environment 210, the verification device 140 may determine that the deviation range 178 for the IP address is ½ by calculating the number of used IP addresses over the total number of users 102. If the hundred users 102 use ten IP addresses, the verification device 140 may determine that the deviation range 178 for the IP address is ¹/₁₀ by calculating the number of used IP addresses over the total number of users 102.

In another example where the feature 154 is the time period during which the user 102a has accessed a given virtual environment 210 (i.e., lifetime access), if the time period for the user 102a is more than a certain duration (e.g., more than ten years), the verification device 140 may determine that the feature 154 is a prioritized feature 208—meaning that the lifetime access provides more than the desired amount of insight to the user activities 152 of the user 102 in the virtual environment 210. Otherwise, it is determined that the lifetime access is not a prioritized feature 208.

In another example where the feature 154 is the number of historical interactions between the users 102 (e.g., between avatars 220), if the number of historical interactions varies more than a threshold deviation 180 (e.g., more than 50%, 55%, etc. deviation between the maximum number of historical interactions and the minimum number of historical interactions for different users 102 and/or in comparison between the users 102), it is determined that the number of historical interactions between the users 102 is a prioritized feature 208—i.e., it provides insight about the number of historical interactions of the users 102, such that it can be used to differentiate between the users 102. Otherwise, it is determined that the number of historical interactions is not a prioritized feature 208. A similar operation can be applied to the example where the feature 154 is the number of interactions between the users 102 (e.g., avatars 220) and their entities 230. In this manner, the verification device 140 determines and selects the prioritized features 208 from the features 154.

In certain embodiments, the verification device 140 may assign weight values 212 to the features 154 based on their deviation ranges 178 that may represent their importance levels and/or priority levels. For example, the verification device 140 may assign a weight value 212 to a respective feature 154 proportional to its priority level indicated by the machine learning module 176 or an operator manually. For example, the verification device 140 may assign a high weight value 212 to a feature 154 if it is determined that the feature 154 is a prioritized feature 208.

Each of the features 154 may have a different priority level (compared to other features 154) proportional to the deviation range 178 of the respective feature 154. Each of the prioritized features 208 may have a different priority level (compared to other prioritized features 208) proportional to the deviation range 178 of the respective prioritized feature 208. For example, the verification device 140 may assign a weight value 212 to a respective feature 154 proportional to the deviation range 178 of the respective feature 154.

If the deviation range 178 of the feature 154 is low (e.g., less than 10%, 5%, etc. of the total value), the weight value 212 assigned to the feature 154 may be low (e.g., less than 10%, 5%, etc. of the total value). If the deviation range 178 of the feature 154 is medium (e.g., between 50% and 55%, etc. of the total value), the weight value 212 assigned to the feature 154 may be medium (e.g., between 50% and 55%, etc. of the total value). If the deviation range 178 of the feature 154 is high (e.g., more than 80%, 85%, etc. of the total value), the weight value 212 assigned to the feature 154 may be high (e.g., more than 80%, 85%, etc. of the total value).

Determining Whether a User is Associated with an Anomaly

The verification device 140 may feed the selected prioritized features 208 to the token generator 172. The token generator 172 may generate a confidence score 168 based on the prioritized features 208, their deviation ranges 178, and weight values 212. For example, the token generator 172 may implement a statistical algorithm (described in FIG. 1) to generate the confidence score 168. For example, the token generator 172 may determine a weighted sum of the values of the prioritized features 208 and their weight values 212. In a particular example where the prioritized feature 208 does not have a value (e.g., in case of the IP address), a value that represents the deviation range 178 of the prioritized feature 208 may be used in determining the weighted sum along with its weight value 212.

In certain embodiments, if the confidence score 168 is low or less than a threshold percentage (e.g., less than 60%, 50%, etc.), the verification device 140 may determine that the user 102a is associated with an anomaly 214.

Examples of the anomaly 214 may include that the user 102a has been involved in fraudulent activity, the user 102a has performed an unexpected interaction or activity in the virtual environment, among others. For example, fraudulent activity may include that the user 102 has been identified as a bad actor, for example, by attempting to gain unauthorized access to other avatars 220, performing an interaction with another avatar 220 or entity 230 that is against the virtual environment guidelines, among others. For example, the unexpected interaction or activity may include that the user 102 has not logged into the virtual environment 210 for more than a certain period (e.g., more than five years, etc.) and suddenly the login frequency shows that the user 102 logs into the virtual environment 210 more than a threshold frequency (e.g., more than five times a day, etc.). In another example, the unexpected interaction or activity may include that the user 102a has not performed any interaction or less than a threshold number of interactions with other users 102 (or their avatars 220b-n) or other entities 230 in the virtual environment 210, and suddenly the number of the historical interaction of the user 102a over the certain period 182 shows that the user 102 has performed more than a threshold number of interactions with other users 102 (or their avatars 220b-n) or other entities 230 in the virtual environment 210.

In certain embodiments, the verification device 140 may use the confidence score 168 to determine whether to allow the user 102a to perform an interaction with other users 102 (or their avatars 220b-n) or other entities 230 in the virtual environment 210. For example, assume that the user 102a wants to perform an interaction with other users 102 (or their avatars 220b-n) or other entities 230 in the virtual environment 210. The user 102a, via the computing device 120a, may send a request 218 to the verification device 140, where the request 218 indicates that the user 102 wants to perform an interaction with another user 102/avatar 220/entity 230 in the virtual environment 210. The request 218 may be sent to the other user 102/avatar 220/entity 230, and the verification device 140 may detect the request 218 by monitoring the user activities 152. The interaction may be any of the interactions described above.

The verification device 140 may determine whether the confidence score 168 of the user 102*a* is more than a threshold score 216. The threshold score 216 may be 60%, 65%, or any other suitable threshold percentage of the total allowed score that can be given. If it is determined that the confidence score 168 of the user 102*a* is more than the threshold score 216, the verification device 140 may authorize the user 102*a* to perform the interaction—i.e., grants the user's request 218. In other words, the verification device 140 may determine that the user 102*a* is not associated with an anomaly 214. If it is determined that the confidence score 168 of the user 102*a* is less than the threshold score 216, the verification device 140 may prevent the user 102*a* to perform the interaction—i.e., rejects the user's request 218. In other words, the verification device 140 may determine that the user 102*a* is associated with an anomaly 214. In some cases, a bad actor may hack into the user's virtual profile, access the user's avatar 220, and perform unexpected actions, interactions, or fraudulent activities in the virtual environment 210. The verification device 140 detects such activities and prevents the hacked user's avatar 220 from performing any action until the hacked user's avatar 220 and user's virtual profile are recovered.

In certain embodiments, the verification device 140 may classify the users 102 into different classes or clusters based on their confidence scores 168. For example, the verification device 140 may classify a first group of users 102 with low confidence scores 168 (e.g., less than a threshold value, such as less than 30%, 35%, and the like) into a first class, classify a second group of users 102 with medium confidence scores 168 (e.g., between two values, such as between 35% and 55%, and the like) into a second class, and classify a third group of users 102 with high confidence scores 168 (e.g., more than a threshold value, such as more than 55%, 60%, and the like) into a third class. The verification device 140 may use this clustering information (i.e., user clustering information 226) to further refine and increase the accuracy of a list of potential users 102 associated with anomalies 214 and users 102 associated with suspicious activities.

In certain embodiments, the verification device 140 may detect outlier users 102 in determining their confidence scores 168 and determining whether a user 102 is associated with an anomaly 214. For example, if a user 102 has not logged into the virtual environment 210 for more than a certain period (e.g., more than five years, ten years, etc.) and suddenly the login frequency shows that the user 102 has logged into the virtual environment 210 and performs more than a threshold number of interactions with other avatars 220 or entities 230, the verification device 140 may determine that the user 102 is an outlier. For example, the user 102 may genuinely start performing interactions in the virtual environment 210. In another example, the interactions may be suspicious. In another example, a bad actor may have gained unauthorized access to the user's account and avatar 220 and use it to perform fraudulent interactions in the virtual environment 210. The verification device 140 may use this information (i.e., user outlier information 222) to further refine and increase the accuracy of a list of potential users 102 associated with anomalies 214 and users 102 associated with suspicious activities.

In certain embodiments, the verification device 140 may detect routing of transferring of virtual resources that each avatar 220 transfers to other avatars 220 or entities 230. By detecting and following the transfer paths of virtual resources among avatars 220 and entities 230, suspicious transfers and interactions may be detected. Suspicious transfers and interactions may be associated with avatars 220 that are already identified to be bad actors based on detecting attempts of those avatars 220 to gain unauthorized access to other avatars, resources, performed an interaction with another avatar or entity that is against the virtual environment guidelines, among others. The verification device 140 may use this information (i.e., virtual resource transfer routing information 224) to further refine and increase the accuracy of a list 228 of potential users 102 associated with anomalies 214, such as users 102 associated with suspicious activities.

In certain embodiments, the verification device 140 may use the user clustering information 226, user outlier information 222, and virtual resource transfer routing information 224 to further refine and increase the accuracy of a list 228 of potential users 102 associated with anomalies 214, such as users 102 associated with suspicious activities. For example, the verification device 140 may feed this information to a machine learning algorithm (such as a rule-based machine learning algorithm) that is executed by the processor 142 executing the software instructions 148. The list 228 of potential users 102 associated with anomalies 214 may be studied by an operator. The operator may evaluate the user clustering information 226, user outlier information 222, and virtual resource transfer routing information 224, the features 154, prioritized features 208, user activities 152, user information 158, user information 164, and user profile 170 associated with the user 102. The operator may confirm, override, update, and/or edit the list 228 based on their evaluation of the information. The evaluation of the operator may be used as feedback to further refine the operation of the system 100 and further increase the accuracy of determining the prioritized features 208, user clustering information 226, user outlier information 222, and virtual resource transfer routing information 224, and the list 228.

Example Method for Anomaly Detection within a Virtual Environment

Figure 3:
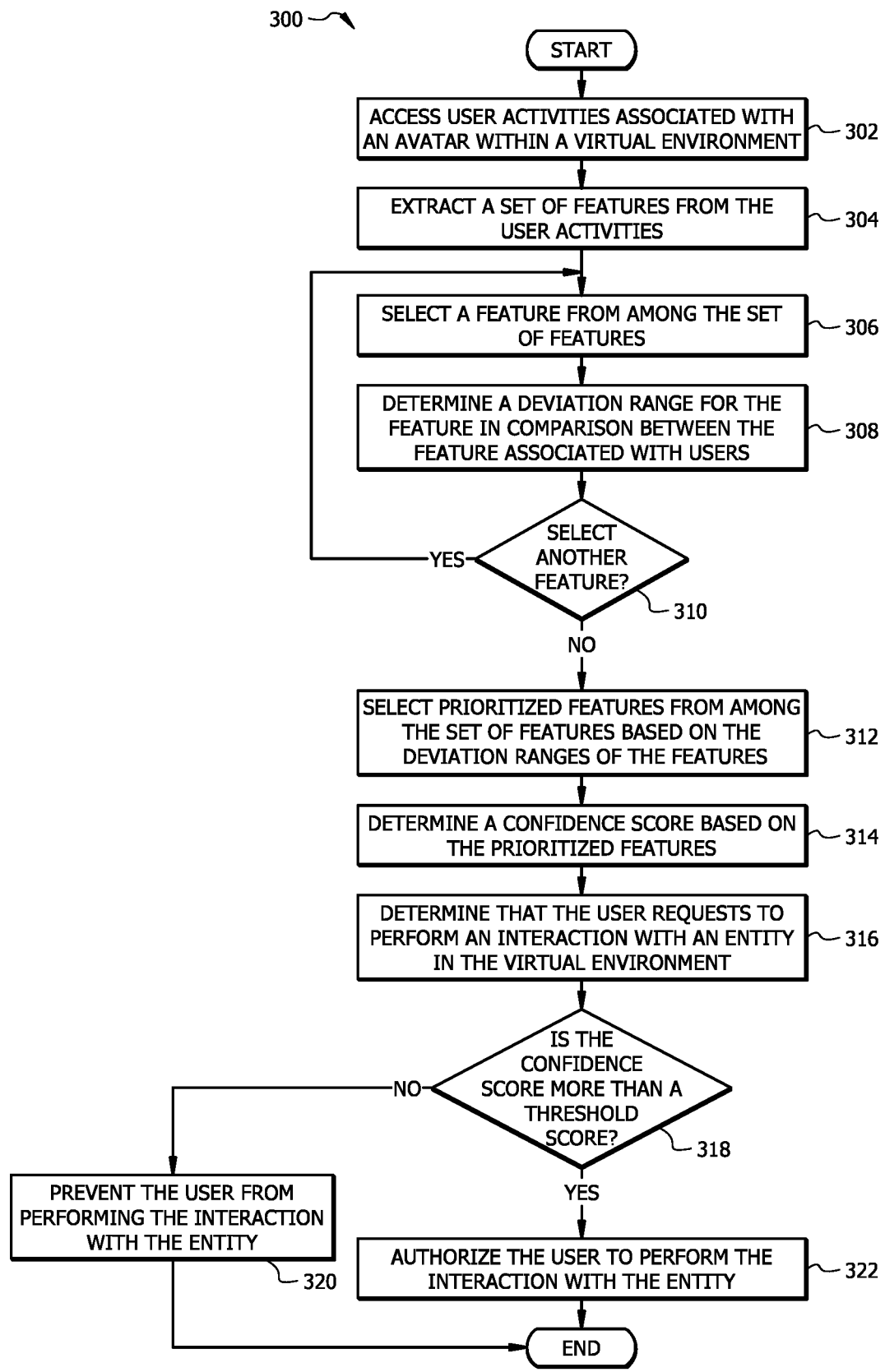
FIG. 3 illustrates an example flowchart of a method for anomaly detection within a virtual environment.

FIG. 3 illustrates an example flowchart of a method 300 for anomaly detection within a virtual environment 210. Modifications, additions, or omissions may be made to method 300. Method 300 may include more, fewer, or other operations. For example, operations may be performed in parallel or in any suitable order. While at times discussed as the system 100, verification device 140, or components of any of thereof performing operations, any suitable system or components of the system may perform one or more operations of the method 300. For example, one or more operations of method 300 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 302-322.

At operation 302, the verification device 140 accesses user activities 152 associated with an avatar 220*a* (and its respective user 102*a*) within a virtual environment 210. In certain embodiments, verification device 140 may access user activities 152 associated with an avatar 220*a* (and its respective user 102*a*) within multiple virtual environments 210. For example, the verification device 140 may have access to the login credentials of the user 102*a* that the user 102*a* uses to log into the application 122 and operate the avatar 220*a* in one or more virtual environments 210*a-n*. The user activities 152 may include interactions between the avatar 220a and other avatars 220b-n and/or entities 230 in virtual environments 210a-n, similar to that described in FIGS. 1 and 2.

At operation 304, the verification device 140 extracts a set of features 154 from the user activities 152. For example, the verification device 140 feeds the user activities 152 to the feature extractor machine learning module 174 to extract the features 154. The examples of features 154 are described in FIG. 2. The set of features 154 provides information about at least the interactions of the user 102a (or the avatar 220a) with other avatars 220b-n and/or entities 230.

At operation 306, the verification device 140 selects a feature 154 from among the set of features 154. The verification device 140 may iteratively select a feature 154 until no feature 154 is left for evaluation.

At operation 308, the verification device 140 determines a deviation range 178 for the feature 154 in comparison between the feature 154 associated with users 102 (or avatars 220). In this process, the verification device 140 may compare the feature 154 between the users 102. For example, the verification device 140 may compare each instance of the feature 154 among the users 102. In certain embodiments, the deviation range 178 may indicate a deviation between a first value associated with the selected feature 154 associated with a first user 102a and a second value associated with the selected feature 154 associated with one or more other users 102 over a certain period 182. For example, determining a first deviation range 178 associated with a first feature 154 may include determining a first value associated with the first feature 154 associated with the first user 102a (or the first avatar 220a), determining a second value associated with the first feature 154 associated with one or more other users 102 (or the other avatars 220b-n), and determining a difference between the first value with the second value, where the difference between the first value and the second value is the first deviation range 178. In certain embodiments, the deviation range 178 associated with a feature 154 may indicate a deviation between the maximum value and the minimum value of the feature 154 over the certain period 182. In certain embodiments, a similar operation may be performed for any of the virtual environments 210a-n. For example, the verification device 140 may access second user activities 152 associated with the avatar 220a in a second virtual environment 210n, where the second user activities 152 may include interactions between the avatar 220a and other entities 230 and/or other avatars 220b-n in the second virtual environment 210n. The verification device 140 may extract a second set of features 154 from the second user activities 152, where the second set of features 154 may provide information about the interactions between the avatar 220a and other entities 230 and/or other avatars 220b-n in the second virtual environment 210n. For a second feature 154, the verification device 140 may determine a second deviation range 178 that indicates a deviation between the maximum value and the minimum value of the second feature 154 over the certain period 182. Other example embodiments of the deviation range 178 are described in FIG. 2.

At operation 310, the verification device 140 determines whether to select another feature 154. The verification device 140 determines to select another feature 154 if at least one feature 154 is left for evaluation. If the verification device 140 determines to select another feature 154, method 300 may return to 306. Otherwise, method 300 may proceed to 312.

At operation 312, the verification device 140 selects prioritized features 208 from among the set of features 154 based on the deviation ranges 178 of the features 154. For example, the verification device 140 may feed the features 154 to the machine learning module 176 that is configured to select the prioritized features 208, similar to that described in FIG. 2. In certain embodiments, the verification device 140 may select the prioritized features 208 further based on the values associated with the features 154. For example, if a feature 154 is associated with a value more than a threshold value (e.g., it is among the top 10% of the values for the feature 154 among the users 102), the feature 154 may be selected as a prioritized feature 208. The verification device 140 may assign weight values 212 to the features 154, e.g., based on the deviation ranges 178, similar to that described in FIG. 2.

At operation 314, the verification device 140 determines a confidence score 168 based on the prioritized features 208. For example, the verification device 140 may feed the prioritized features 208 to the token generator 172 to determine the confidence score 168, similar to that described in FIG. 2. The confidence score 168 may be a token, such as a number, a score value, and the like. The confidence score 168 is updatable based on the features 154 and user activities 152. For example, as the user 102a (or the avatar 220a) performs various interactions with other avatars 220b-n and/or entities 230, the user activities 152 and the features 154 may be updated or changed. Thus, this may affect the deviation ranges 178, weight values 212 and consequently the confidence score 168. The confidence score 168 associated with the user 102a may indicate whether the user 102a is associated with an anomaly 214 or not. If the confidence score 168 is more than a threshold score 216, it is determined that the user 102a is not associated with an anomaly 214. If the confidence score 168 is less than the threshold score 216, it is determined that the user 102a is associated with an anomaly 214. Examples of the anomaly 214 are described in FIG. 2.

At operation 316, the verification device 140 determines that the user 102a requests to perform an interaction with an entity 230 in the virtual environment 210. For example, the user 102a may operate the avatar 220a to request to perform an interaction with the entity 230. The verification device 140 monitoring the user activities 152 may detect the user's request 218, similar to that described in FIG. 2.

At operation 318, the verification device 140 determines whether the confidence score 168 is more than the threshold score 216. If it is determined that the confidence score 168 is more than the threshold score 216, method 300 may proceed to operation 322. Otherwise, method 300 may proceed to operation 320.

At operation 320, the verification device 140 prevents the user 102a from performing the interaction with the entity 230. At operation 322, the verification device 140 authorizes the user 102a to perform the interaction with the entity 230. Although this example is described with respect to the user 102a requesting to perform an interaction with an entity 230, it should be understood that a similar operation may be performed when the user 102a requests to perform an interaction with another user 102 (or another avatar 220).

In certain embodiments, if the verification device 140 determines that a deviation range 178 of a feature 154 (e.g., among users 102) is more than the threshold deviation 180 (e.g., more than 80%, 85%, etc. of the maximum value), the verification device 140 may update the confidence score 168 based on the feature 154 and the deviation range 178 (e.g., proportional to the deviation range 178).

In certain embodiments, if the verification device 140 determines that a deviation range 178 of a feature 154 (e.g., among users 102) is less than the threshold deviation 180, the confidence score 168 may not be updated based on the feature 154 or the deviation range 178.

In certain embodiments, if the verification device 140 determines that the deviation range 178 for a feature 154 is more than a threshold deviation 180, the verification device 140 may update the confidence score 168 based on the feature 154 (and the respective deviation range 178, e.g., proportional to the deviation range 178).

In certain embodiments, updating the confidence score 168 may include increasing the confidence score 168 proportional to a deviation range 178 for a feature 154 (or a prioritized feature 208). For example, since the prioritized features 208 are determined based at least on the deviation ranges 178 of the features 154, and the confidence score 168 is determined based at least on the prioritized features 208 and the deviation ranges 178 of the prioritized features 208, if a first value for the prioritized feature 208 for the user 102*a* is more than a threshold value (or threshold deviation 180) compared to a second value for the prioritized feature 201 for the other users 102, (e.g., the deviation range 178 for the prioritized feature 208 for the user 102*a* is more than the threshold deviation 180), it may mean that it is less likely that the user 102*a* is associated with an anomaly 214. In other words, the probability of the user 102*a* being associated with an anomaly 214 is less than a threshold percentage (e.g., less than 40%, 35%, etc.). In this example, the verification device 140 may increase the confidence score 168, e.g., linearly proportional or non-linearly proportional to the deviation range 178. Similarly, in certain embodiments, updating the confidence score 168 may include decreasing the confidence score 168 proportional to a deviation range 178 for a feature 154 (or a prioritized feature 208). For example, if a first value for the prioritized feature 208 for the user 102*a* is more than the threshold deviation 180 lesser than a second value for the prioritized feature 201 for the other users 102, (e.g., the deviation range 178 for the prioritized feature 208 for the user 102*a* is more than the threshold deviation 180), it may mean that it is more likely that the user 102*a* is associated with an anomaly 214. In other words, the probability of the user 102*a* being associated with an anomaly 214 is more than a threshold percentage (e.g., more than 70%, 75%, etc.). In this example, the verification device 140 may decrease the confidence score 168, e.g., linearly proportional or non-linearly proportional to the deviation range 178.

Example Method for Optimizing Anomaly Detection within a Virtual Environment

Figure 4:
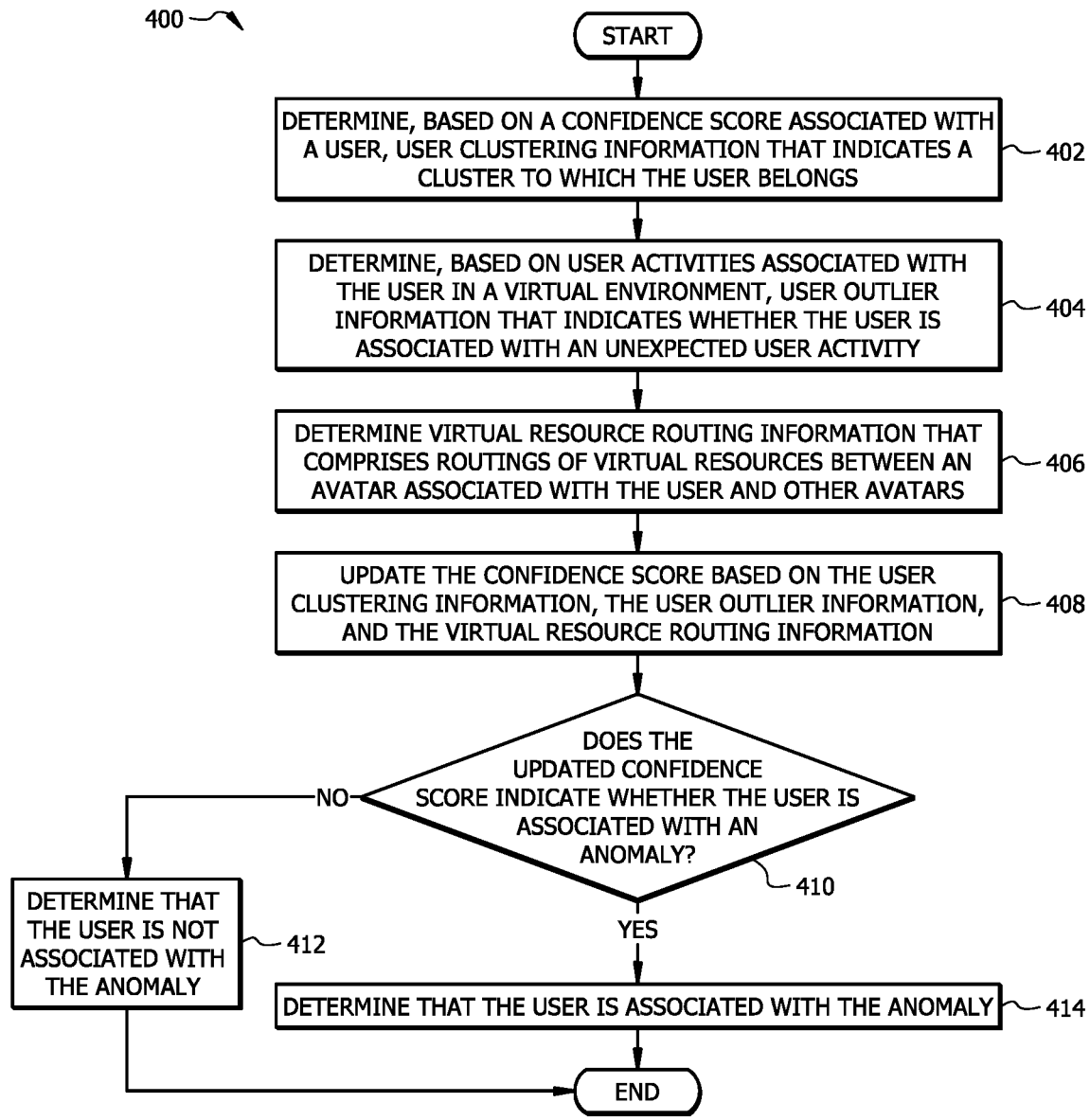
FIG. 4 illustrates an example flowchart of a method for optimizing anomaly detection based on user clustering information, user outlier information, and virtual resource transfer routing information.

FIG. 4 illustrates an example flowchart of a method 400 for optimizing anomaly detection within a virtual environment 210. Modifications, additions, or omissions may be made to method 400. Method 400 may include more, fewer, or other operations. For example, operations may be performed in parallel or in any suitable order. While at times discussed as the system 100, verification device 140, or components of any of thereof performing operations, any suitable system or components of the system may perform one or more operations of the method 400. For example, one or more operations of method 400 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 402-414.

At operation 402, the verification device 140 determines, based on a confidence score 168 associated with a user 102, user clustering information 226 that indicates a cluster to which the user 102 belongs. The verification device 140 determines the confidence score 168, similar to that described in FIG. 2. The verification device 140 determines the user clustering information 226, similar to that described in FIG. 2. For example, in response to determining that the confidence score 168 is less than a threshold score 216, the verification device 140 determines that the user 102 belongs to a first cluster. In response to determining that the confidence score 168 is more than the threshold score 216, the verification device 140 determines that the user 102 belongs to a second cluster. In certain embodiments, there may be multiple clusters (e.g., two, three, five, ten clusters) and the verification device 140 may determine to which the user 102 belongs based on multiple threshold scores 216. For example, if the confidence score 168 is in a first range (e.g., between a first and a second threshed scores), the verification device 140 determines that the user belongs to a first cluster, if the confidence score 168 is in a second range (e.g., between the second and a third threshold scores), the verification device 140 determines that the user belongs to a second cluster, if the confidence score 168 is in a third range (e.g., between the third and a fourth threshold scores), the verification device 140 determines that the user belongs to a third cluster, where the first threshold score is less than the second threshold score, and the second threshold score is less than the third threshold score. For example, the confidence score 168 ranges may include low, medium-low, medium, medium-high, and high ranges.

At operation 404, the verification device 140 determines, based on user activities 152 associated with the user 102 in the virtual environments 210, user outlier information 222 that indicates whether the user 102 is associated with an unexpected user activity. The user activities 152 may include one or more interactions between the avatar 220 (associated with the user 102) and other avatars 220 (and/or entities 230). The one or more interactions may include transferring virtual resources to another avatar 220 (or entity 230), receiving virtual resources from another avatar 220 (or entity 230), and any other kind of data communication between the avatar 220 associated with the user 102 and other avatars 220 or entity 230. For example, the unexpected user activity may comprise a user performing more than a threshold number of interactions with at least one other avatar after not accessing the virtual environment 210 for more than a threshold period. In another example, unexpected user activity may include that a user has not performed any interaction or less than a threshold number of interactions with other users (or their avatars) or other entities in the virtual environment 210, and suddenly the interactions of the user over the certain period (e.g., within one day, five hours, etc.) show that the user has performed more than a threshold number of interactions with other users (or their avatars) or other entities in the virtual environment 210.

At operation 406, the verification device 140 determines virtual resource routing information 224 that comprises routings of virtual resources between an avatar 220 associated with the user 102 and other avatars 220 within the virtual environment 210. The verification device 140 may determine the virtual resource routing information 224 by monitoring historical and current data communications and resource transfers among avatars 220, and among avatars 220 and entities 230, similar to that described in FIG. 2. The virtual resources may include virtual objects and/or data (e.g., digital documents, digital files, virtual products, virtual services, and the like).

At operation 408, the verification device 140 updates the confidence score 168 based on the user outlier information 222, virtual resource transfer information 224, and user clustering information 226, similar to that described in FIG. 2. For example, updating the confidence score 168 comprises increasing the confidence score 168 until the updated confidence score 168 is more than the threshold score 216, in response to determining that the user outlier information 222 indicates that the user 102 is an outlier, and the user clustering information 226 indicates that the user 102 belongs to the second cluster (where users associated with anomaly 214 belong). In another example, updating the confidence score 168 comprises decreasing the confidence score 168 in response to determining that the user outlier information 222 indicates that the user 102 is not an outlier, and the user clustering information 226 indicates that the user 102 belongs to the second cluster (where users associated with anomaly 214 belong). In another example, updating the confidence score 168 comprises decreasing the confidence score 168 until the updated confidence score 168 is less than the threshold score 216 in response to determining that the virtual resource routing information 224 indicates that the user 102 has transferred a virtual resource associated with the anomaly 214 to another avatar within the virtual environment 210.

At operation 410, the verification device 140 determines whether the updated confidence score 168 indicates whether the user 102 is associated with an anomaly 214. If the verification device 140 determines that the updated confidence score 168 indicates that the user 102 is associated with an anomaly 214, method 400 proceeds to operation 412. Otherwise, method 400 proceeds to operation 414.

At operation 412, the verification device 140 determines that the user 102 is not associated with an anomaly 214. At operation 414, the verification device 140 determines that the user 102 is associated with an anomaly 214. In certain embodiments, the verification device 140 determines that the user 102 requests to perform an interaction with an entity 230 (or another avatar 220) in the virtual environment 210. The verification device 140 determines whether the updated confidence score 168 is more than the threshold score 216. If the updated confidence score 168 is more than the threshold score 216, the verification device 140 may authorize the user 102 to perform the interaction with the entity 230 (or the other avatar 220), similar to that described in FIGS. 2 and 3. Otherwise, the verification device 140 may prevent the user 102 from performing the interaction with the entity 230 (or the other avatar 220).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for implementing anomaly detection, comprising:
 a memory configured to store first user activities associated with an avatar within a first virtual environment, wherein:
  the avatar is associated with a user; and
  the first user activities comprise one or more first interactions between the avatar and other entities in the first virtual environment; and
 a processor operably coupled with the memory, and configured to:
  access the first user activities;
  extract a first set of features from the first user activities, wherein the first set of features provides information about at least the one or more first interactions;
  for each feature of the first set of features, determine a first deviation range that indicates a deviation between a selected feature associated with the user and the selected feature associated with one or more other users over a certain period;
  assign the selected feature to a second set of features when the first deviation range is more than a threshold deviation;
  determine a priority weight for each feature included in the second set of features;
  apply the priority weight to the first deviation range of each feature included in the second set of features to determine a weighted deviation range of each feature;
  determine a combined deviation range by combining the weighted deviation range of each feature included in the second set of features; and
  determine a confidence score associated with the user based at least in part upon the combined deviation range, wherein the confidence score indicates whether the user is associated with an anomaly, such that:
   if the confidence score is more than a threshold percentage, the user is not associated with an anomaly; and
   if the confidence score is less than the threshold percentage, the user is associated with the anomaly.

2. The system of claim 1, wherein in response to determining that the first deviation range is less than the threshold deviation, the confidence score is not updated based on the selected feature.

3. The system of claim 1, wherein the processor is further configured to:
 access second user activities associated with the avatar within a second virtual environment, wherein the second user activities comprise one or more second interactions between the avatar and other entities in the second virtual environment;

extract a second set of features from the second user activities, wherein the second set of features provides information about at least the one or more second interactions;

for a second feature from among the second set of features, determine a second deviation range that indicates a deviation between a maximum value and a minimum value of the second feature over the certain period;

determine whether the second deviation range is more than the threshold deviation; and in response to determining that the second deviation range is more than the threshold deviation, update the confidence score based at least in part upon the second feature.

4. The system of claim 3, wherein updating the confidence score based at least in part upon the second feature comprises:

increasing the confidence score proportional to the first deviation range; or decreasing the confidence score proportional to the first deviation range.

5. The system of claim 1, wherein the processor is further configured to:

determine that the user requests to perform an interaction with an entity in the first virtual environment;

determine whether the confidence score is more than a threshold score; and in response to determining that the confidence score is more than the threshold score, authorize the user to perform the interaction with the entity.

6. The system of claim 5, wherein the processor is further configured to, in response to determining that the confidence score is less than the threshold score, prevent the user to perform the interaction with the entity.

7. The system of claim 1, wherein the first set of features comprises at least one of:

a frequency of historical interactions with the other entities; and a number of historical interactions with the other entities.

8. A method for implementing anomaly detection, comprising:

accessing first user activities associated with an avatar within a first virtual environment, wherein:
the avatar is associated with a user; and
the first user activities comprise one or more first interactions between the avatar and other entities in the first virtual environment;

extracting a first set of features from the first user activities, wherein the first set of features provides information about at least the one or more first interactions;

for each feature of the first set of features, determining a first deviation range that indicates a deviation between a selected feature associated with the user and the selected feature associated with one or more other users over a certain period;

assigning the selected feature to a second set of features when the first deviation range is more than a threshold deviation;

determining a priority weight for each feature included in the second set of features;

applying the priority weight to the first deviation range of each feature included in the second set of features to determine a weighted deviation range of each feature;

determining a combined deviation range by combining the weighted deviation range of each feature included in the second set of features; and determining a confidence score associated with the user based at least in part upon the combined deviation range, wherein the confidence score indicates whether the user is associated with an anomaly, such that:
if the confidence score is more than a threshold percentage, the user is not associated with an anomaly; and
if the confidence score is less than the threshold percentage, the user is associated with the anomaly.

9. The method of claim 8, wherein in response to determining that the first deviation range is less than the threshold deviation, the confidence score is not updated based on the selected feature.

10. The method of claim 8, further comprising:

accessing second user activities associated with the avatar within a second virtual environment, wherein the second user activities comprise one or more second interactions between the avatar and other entities in the second virtual environment;

extracting a second set of features from the second user activities, wherein the second set of features provides information about at least the one or more second interactions;

for a second feature from among the second set of features, determining a second deviation range that indicates a deviation between a maximum value and a minimum value of the second feature over the certain period;

determining whether the second deviation range is more than the threshold deviation; and in response to determining that the second deviation range is more than the threshold deviation, updating the confidence score based at least in part upon the second feature.

11. The method of claim 10, wherein updating the confidence score based at least in part upon the second first feature comprises:

increasing the confidence score proportional to the deviation range; or decreasing the confidence score proportional to the first deviation range.

12. The method of claim 8, further comprising:

determining that the user requests to perform an interaction with an entity in the first virtual environment;

determining whether the confidence score is more than a threshold score; and in response to determining that the confidence score is more than the threshold score, authorizing the user to perform the interaction with the entity.

13. The method of claim 12, further comprising, in response to determining that the confidence score is less than the threshold score, preventing the user to perform the interaction with the entity.

14. The method of claim 8, wherein the first set of features comprises at least one of:

a frequency of historical interactions with the other entities; and a number of historical interactions with the other entities.

15. A non-transitory computer-readable medium that stores instructions, wherein when the instructions are executed by one or more processors, cause the one or more processors to:

access first user activities associated with an avatar within a first virtual environment, wherein:
the avatar is associated with a user; and the first user activities comprise one or more first interactions between the avatar and other entities in the first virtual environment; and extract a first set of features from the first user activities, wherein the first set of features provides information about at least the one or more first interactions;

for each feature of the first set of features, determine a first deviation range that indicates a deviation between a selected feature associated with the user and the selected feature associated with one or more other users over a certain period;

assign the selected feature to a second set of features when the first deviation range is more than a threshold deviation;

determine a priority weight for each feature included in the second set of features;

apply the priority weight to the first deviation range of each feature included in the second set of features to determine a weighted deviation range of each feature;

determine a combined deviation range by combining the weighted deviation range of each feature included in the second set of features; and determine a confidence score associated with the user based at least in part upon the combined deviation range, wherein the confidence score indicates whether the user is associated with an anomaly, such that:
  if the confidence score is more than a threshold percentage, the user is not associated with an anomaly; and
  if the confidence score is less than the threshold percentage, the user is associated with the anomaly.

16. The non-transitory computer-readable medium of claim 15, wherein in response to determining that the first deviation range is less than the threshold deviation, the confidence score is not updated based on the selected feature.

17. The non-transitory computer-readable medium of claim 15, wherein the instructions when executed by the one or more processors, further cause the one or more processors to:
  access second user activities associated with the avatar within a second virtual environment, wherein the second user activities comprise one or more second interactions between the avatar and other entities in the second virtual environment;
  extract a second set of features from the second user activities, wherein the second set of features provides information about at least the one or more second interactions;
  for a second feature from among the second set of features, determine a second deviation range that indicates a deviation between a maximum value and a minimum value of the second feature over the certain period;
  determine whether the second deviation range is more than the threshold deviation; and
  in response to determining that the second deviation range is more than the threshold deviation, update the confidence score based at least in part upon the second feature.

18. The non-transitory computer-readable medium of claim 17, wherein updating the confidence score based at least in part upon the second feature comprises:
  increasing the confidence score proportional to the first deviation range; or
  decreasing the confidence score proportional to the first deviation range.

19. The non-transitory computer-readable medium of claim 15, wherein the instructions when executed by the one or more processors, further cause the one or more processors to:
  determine that the user requests to perform an interaction with an entity in the first virtual environment;
  determine whether the confidence score is more than a threshold score; and
  in response to determining that the confidence score is more than the threshold score, authorize the user to perform the interaction with the entity.

20. The non-transitory computer-readable medium of claim 15, wherein determining the first deviation range comprises:
  determining a first value of the selected feature associated with the user;
  determining a second value of the selected feature associated with the one or more other users; and
  determining a difference between the first value with the second value, wherein the difference between the first value and the second value is the first deviation range.

* * * * *